United States Patent [19]
Lehtinen

[11] Patent Number: 6,064,950
[45] Date of Patent: May 16, 2000

[54] MONITORING OF LOAD SITUATION IN A SERVICE DATABASE SYSTEM

[75] Inventor: Pekka Lehtinen, Järvenpää, Finland

[73] Assignee: Nokia Telecommunications Oy, Espoo, Finland

[21] Appl. No.: 09/249,862

[22] Filed: Feb. 16, 1999

Related U.S. Application Data

[63] Continuation of application No. PCT/FI97/00506, Aug. 29, 1997.

[30] Foreign Application Priority Data

Aug. 29, 1996 [FI] Finland .................................... 963371

[51] Int. Cl.⁷ .............................. G06F 17/30; G06F 11/34
[52] U.S. Cl. ........................... 702/186; 707/101; 379/211
[58] Field of Search ............................ 702/186; 379/220, 379/207, 211, 221; 709/226; 707/101

[56] References Cited

U.S. PATENT DOCUMENTS

| | | |
|---|---|---|
| 4,918,593 | 4/1990 | Huber . |
| 5,067,099 | 11/1991 | McCown et al. ....................... 702/183 |
| 5,446,884 | 8/1995 | Schwendemann et al. ............ 707/202 |
| 5,499,358 | 3/1996 | Nevarez .................................. 707/101 |
| 5,570,410 | 10/1996 | Hooshiari ............................... 379/221 |

FOREIGN PATENT DOCUMENTS 195 38 804  5/1996  Germany.
WO 96/16519  5/1996  WIPO.

OTHER PUBLICATIONS

1995, Goldstein, B., et al. (Editors), New Telecommunication Services for Developing Networks, St. Petersburg International Teletraffic Seminar, Loniis, St. Petersburg.

Primary Examiner—Kamini Shah
Attorney, Agent, or Firm—Altera Law Group LLC

[57] ABSTRACT

The invention relates to a method for monitoring the load situation in a service database system. The system generates a list which includes a desired number of measurement objects which are largest in respect to counter values. In order to obtain measurement data more efficiently in real-time, (a) the recording and zeroing of counter values is performed during each recording interval one measurement object at a time, (b) list is generated by the recording interval so that it is checked within a recording interval during the processing of each individual object whether the counter value of the object in question is greater than that of the object with the smallest counter value included in the list at the time and if this is the case, the object with the smallest counter value included in the list is replaced with the object corresponding to the row in question.

10 Claims, 9 Drawing Sheets

MONITORING OF LOAD SITUATION IN A SERVICE DATABASE SYSTEM

This application is a continuation of international application number PCT/FI97/00506, filed Aug. 29, 1997.

FIELD OF THE INVENTION

The invention is generally related to service database systems and especially to a method which can be used to monitor the load situation in a service database system. One preferable area of application consists of the service database systems of an intelligent network.

BACKGROUND OF THE INVENTION

The fast development of telecommunications has made it possible for operators to offer users a large number of different services. A network architecture that provides advanced services is called an intelligent network. The common abbreviation for intelligent network is IN.

Figure 1:
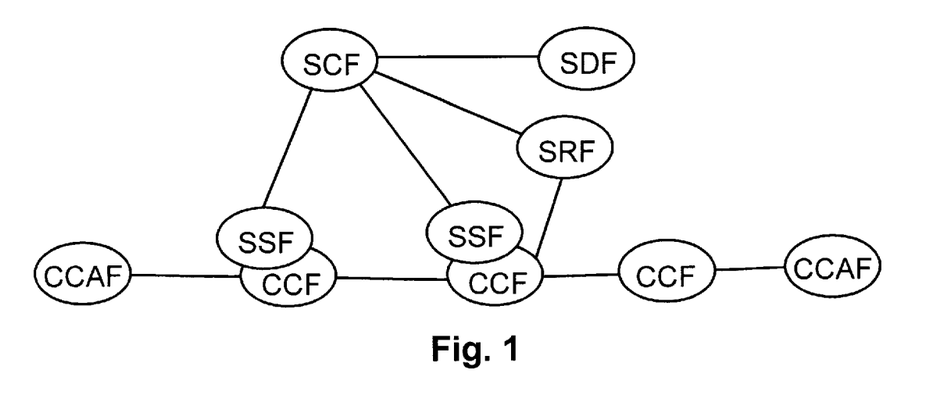
FIG. 1 shows the functional architecture of the intelligent network.

The functional architecture of an intelligent network is shown in FIG. 1 where the functional entities of the network are shown as ovals. This architecture is described briefly below, because the invention will be described later by referring to the intelligent network environment.

The access of the end user (subscriber) to the network is handled by the CCAF (Call Control Agent Function). The access to the IN services is implemented by making additions to existing digital exchanges. This is done by using the basic call state model BCSM which describes the existing functionality used to process a call between two users. The BCSM is a high level state automaton description of the call control functions CCF required for establishing and maintaining a connection route between users. Functionality is added to this state model by using the service switching function SSF (cf. the partial overlap of the entities CCF and SSF in FIG. 1) so that it is possible to decide when it is necessary to call the services of the intelligent network (the IN services). After these IN services have been called, the service control function SCF that contains the service logic for the intelligent network handles the service-related processing (of the call attempt). The service switching function SSF thereby connects the call control function CCF to the service control function SCF and allows the service control function SCF to control the call control function CCF. For example, SCF can request that the SSF/CCF performs specific call or connection functions, for example, charging or routing operations. The SCF can also send requests to the service data function SDF which handles the access to the services-related data and network data of the intelligent network. The SCF can thereby, for example, request the SDF to retrieve specific service-related data or update this data.

The functions described above are further complemented by the specialized resources function SRF which provides the special functions required for implementing some of the services provided by the intelligent network. Examples of these services are protocol conversions, speech recognition and voice mail. The SCF can, for example, request the SSF/CCF functions to first establish a connection between the end users and SRF and then it can request the SRF to give voice messages to the end users.

Other functional entities of the intelligent network are various functions that relate to control, such as the SCEF (Service Creation Environment Function), SMF (Service Management Function), and SMAF (Service Management Access Function). The SMF includes, among other things, service control, the SMAF provides the connection to the SMF, and the SCEF makes it possible to specify, develop, test and feed IN services via the SMF to the SCF. Because these functions only relate to the operation of the network operator, they are not shown in FIG. 1.

The role of the functional entities described in FIG. 1 as related to the IN services is described briefly below. The CCAF receives the service request given by the calling party. The service request usually consists of lifting the receiver and/or a series of digits dialled by the calling party. The CCAF further transmits the service request to the CCF/SSF for processing. The call control function CCF does not have the service data but it has been programmed to recognize the need of a service request. The CCF interrupts the call setup for a moment and notifies the service switching function SSF about the state of the call. The task of the SSF is, using predefined criteria, to interpret the service request and thus determine whether the request is a service request related to the IN services. If this is the case, the SSF composes a standardized IN service request and sends the request to the SCF along with information about the state of the service request. The SCF receives the request and decodes it. After that it cooperates with the SSF/CCF, SRF, and SDF to provide the requested service to the end user.

Figure 2:
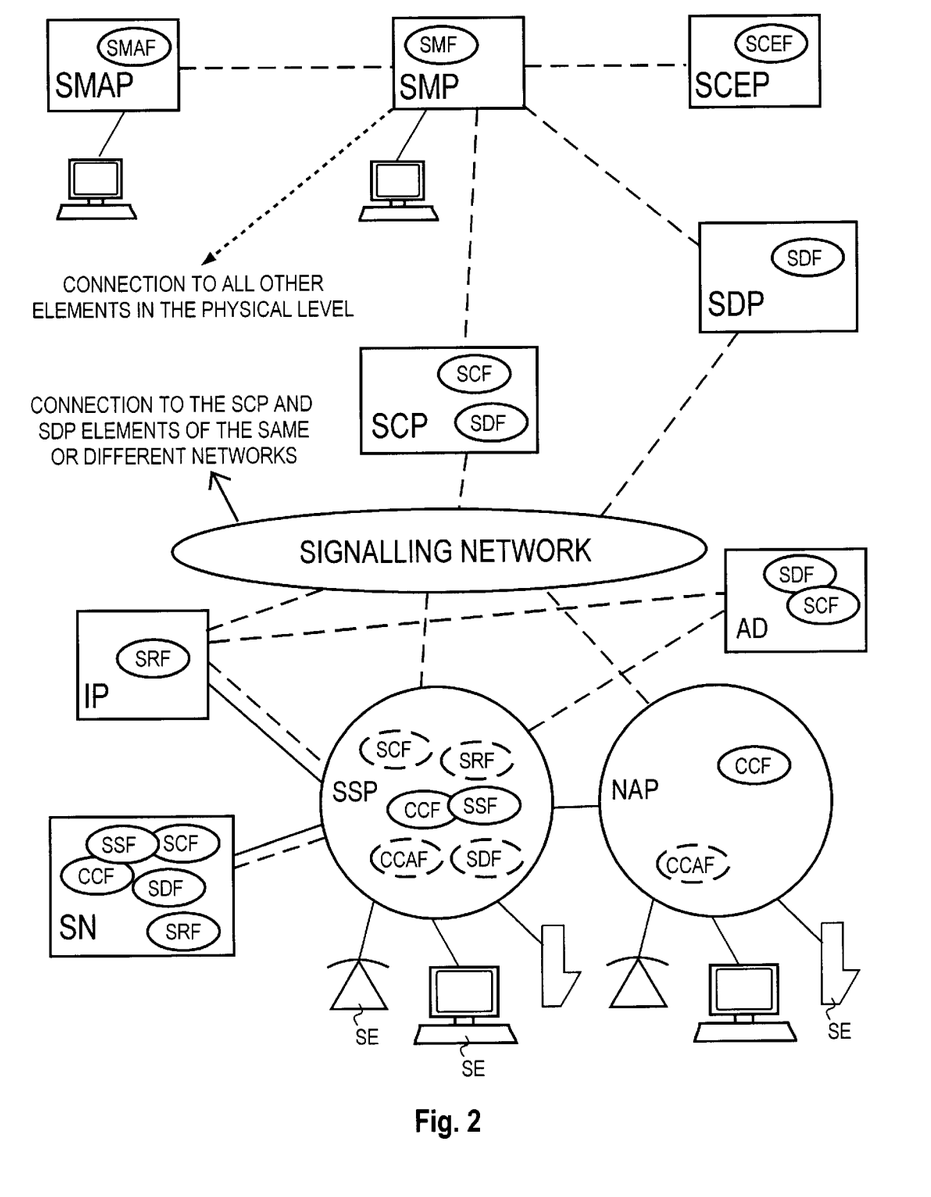
FIG. 2 shows the physical architecture of the intelligent network.

The physical level architecture of the intelligent network describes how the functional entities described above are located in the physical entities of the network. The physical architecture of the intelligent network is illustrated in FIG. 2 where the physical entities are described as rectangles or circles and functional entities as ovals. The signalling connections are described by dashed lines and the actual transport which is, for example, speech, by continuous lines. The optional functional entities are marked by dashed line. The signalling network shown in the Figure is a network according to SS7 (Signalling System Number 7 is a well-known signalling system described in the CCITT (nowadays ITU-T) blue book *Specifications of Signalling System No. 7*, Melbourne 1988).

The subscriber equipment SE which can include, for example, a phone, computer, or a telefax, are connected either directly to a service switching point SSP or to a network access point NAP.

The service switching point SSP provides the user with access to the network and handles all necessary selection functions. The SSP can also detect any IN service requests. Functionally, the SSP includes the call control and service selection functions.

The network access point NAP is a traditional telephone exchange that includes the call control function CCF, for example, a DX 220 exchange which can differentiate calls that require IN services from traditional calls and route the calls that require IN services to the appropriate SSP.

The service control point SCP includes the service programs that are used to produce the IN services.

The service data point SDP is a database containing customer and network data which is used by the service programs of the SCP to produce tailored services. The SCP can use SDP services directly or via the signalling network.

The intelligent peripheral IP provides special services, such as announcements and voice and multiple choice recognition.

The service switching and control point SSCP consists of an SCP and SSP located in the same node (in other words, if the SSP node shown in the drawing contains both an SCF and an SSF entity, the node in question is an SSCP).

The tasks of a service management point SMP include the management of the database (SDP), network monitoring and testing, and collecting network data. It can connect to all other physical entities.

The service creation environment point SCEP is used for specifying, developing and testing the IN services, and for entering the services in SMP.

The service adjunct AD is functionally equivalent to the service control point SCP, but the AD has is directly connected to SSP with a fast data connection (for example, with an ISDN 30B+D connection) instead of via the common channel signalling network SS7.

The service node SN can control the IN services and perform data transfers with users. It communicates directly with one or more SSPs.

The service management access point SMAP is a physical entity which provides certain users with a connection to SMP.

The above is a brief description of the intelligent network as a background to the description of the method according to the invention. Interested readers can get a more detailed description of the intelligent network in, for example, ITU-T specifications Q.121X or in the AIN specifications of Bellcore.

Figure 3:
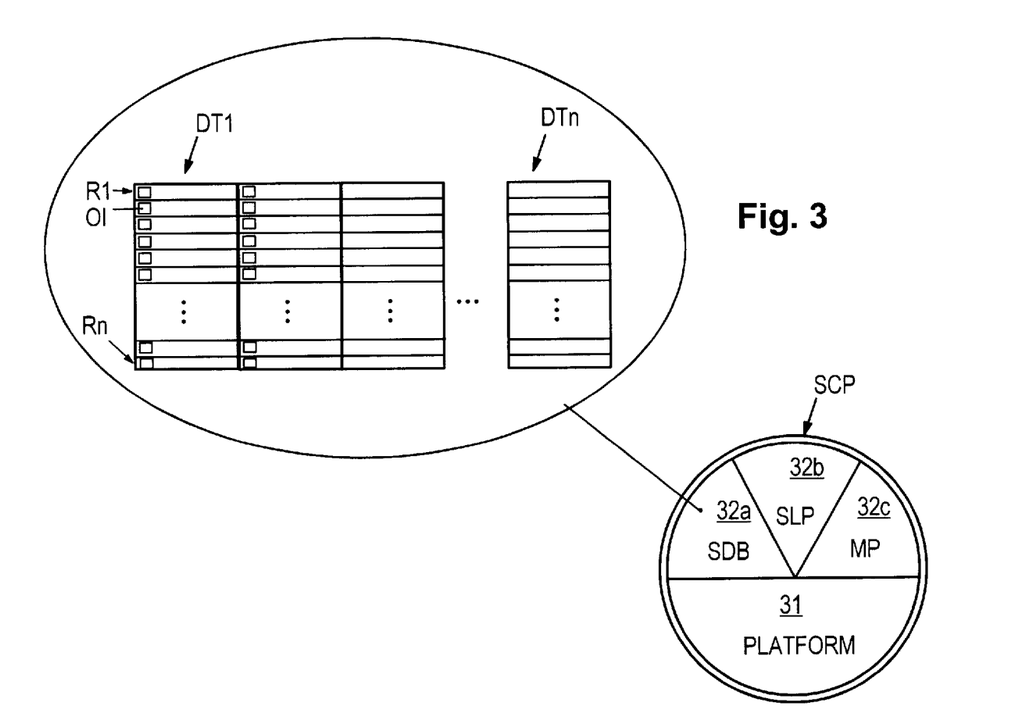
FIG. 3 illustrates the parts of the SCP node essential for event recording.

As described above, SSF sends standardized IN service requests to SCF in certain phases of the call setup. Because the service control point SCP (or the service adjunct AD) is typically a centralized node of the network which serves several exchanges, it is also important that different load measurements are continuously performed in the database of such a centralized service point. For example, the SCP (or AD) can be divided for such measurements into functional parts as shown in FIG. 3. The lowest layer is formed by the so-called platform layer 31 which contains the hardware and the basic operating system (for example, Unix). On top of the platform layer is located the application-specific layer 32 which can be divided into the following three parts: service database (SDB) 32a, service logic programs block (SLP) 32b, and measurement programs block (MP) 32c. Service logic programs are the programs which are triggered by the service requests arriving in the node and provide the actual IN service. These programs thereby perform processing tasks on a call by call basis. The measurement program block, on the other hand, is the entity that handles the processing related to the SCP load. The measurement program block does not therefore perform its tasks on a call by call basis, but it performs its operations, for example, by recording interval or in certain situations, for example, in overload situations.

The service database typically contains data tables (DT) in which each subscriber has a row Ri (i=1, 2, . . . n) of its own. The subscriber identifier OI is included at the beginning of each row as the key. Essential for the invention are the data tables that relate to the aforementioned measurements. One such measurement table corresponds to a group of measurement objects that is called a (measurement) module. The measurement tables of several measurement modules can be put in the same data table, or the measurement table of each measurement module can form a separate data table. A measurement table thereby refers to a module-specific data set that can be a part of a data table in the system or an entire data table. The measurement module will also be referred to as a measurement group.

In the system each subscriber has a dedicated set of counters which are incremented as a result of different events related to the subscriber; for example, the call counter is incremented for each call. The values of the counters are collected by recording interval.

FIG. 3 illustrates the application environment of the method by still using the service control point SCP of an intelligent network as an example. Generally speaking it can be said that the method can be applied to any service database system which randomly receives service requests which are answered by the system. Such a system is described below on a general level without limiting the description to an SCP node of an intelligent network.

So that incoming service requests can be answered, the processor with access to the database must perform service-specific processing. The (measurement) objects related to the service requests are represented by individual rows of the data tables of the database system, which rows are handled by the processor. The system records the number of requests and certain events during recording intervals of specific length.

The objects can be classified into object classes so that all objects in a class are of the same type (for example, subscribers), when the situation is examined from the perspective of the events that are being recorded. Objects of the same type can be formed into a measurement group and more than one measurement group can be defined within each object class. Within each measurement group, each object has related counters which are used to record the events. The counter values can vary from one object to another, but a specific event is interpreted identically by each object; for example, certain events can mean a number translation request for each subscriber (i.e. for each object).

The functionality related to measurement includes the following recording functions regardless of the environment in which the service database system is situated.

As each request is received, a dedicated instance of the service logic procedure is created, the data row of the desired object is retrieved from the data table, and the requested service logic processing is performed. In a measurement group, each individual data row has a related counter group which is used to record the occurrence of different events. During service logic processing the counter values are incremented for recording according to the occurrence of the desired events which are to be recorded.

Furthermore, it would be preferable to put the same processor to handle the service processing, the functions related to recording the events (increasing the counters), and the recording of counter values for several different measurement groups. The recording of counter values refers to the operation where the counter values are retrieved at regular intervals so that they can be written in the memory (log file) or sent to an outside system for processing. In practice, the use of one processor may be the only option. The reason for this is that often the service requests include stringent response time requirements in which case the database must be implemented in RAM memory (not on disk). It is not even possible in all commercial computer systems to have more than one processor accessing a single RAM memory. RAM memory shared by several processors is also difficult to implement because overlapping memory operations must be prevented.

In this kind of database system the overload restriction system requires almost real-time information about which objects under the restriction are under the greatest concentration of call traffic.

In conventional service database systems the lists about the most called objects are generated by using a separate processor during the processing of the measurement data (in the management system after the measurement data has first been transferred there). Thus the picture of the load situation has not always been sufficiently real-time.

SUMMARY OF THE INVENTION

The purpose of the invention is to eliminate the aforementioned drawback and to create a method by means of which the measurement data can be received in real-time more efficiently than hitherto.

This objective is achieved by using a method according to the invention, the method being defined in the independent claims.

The idea of the invention is to maintain a list of the objects, on which most calls are concentrated, in the database by using the recording and zeroing process which processes the measurement objects row by row. The maintenance is handled by comparing the value of a counter located on the row to the smallest value of the list at the time during the individual row processing and performing an update if the value is greater than said smallest value. The idea is, therefore, to connect the determination of the objects with most calls to the zeroing process which is performed during each recording interval to the call counter of each object. The determination of the objects with most calls can thereby be implemented as a measurement group by using the recording and zeroing process. The same principle can be used to generate a list of the objects with least calls.

If, for example, 50 subscriber numbers of a data table are such that a great deal of traffic can concentrate on them during, for example, a certain campaign, a single measurement group is thereby defined in which these 50 objects are included. A short recording interval is defined for this measurement module, for example, 1 minute. Additionally, it can be defined for the module in question that log files are not generated at all, but in the case of the module in question the recording and zeroing process only performs the zeroing and the updating of the list of objects with most calls.

It should be noticed that even though this description speaks of the recording and zeroing process, this refers to the process that handles both the recording of counter values and their zeroing. The counter values are not necessarily immediately written in the log file, but it is possible, for example, to send the counter values to an external system. The process does not always perform both recording and zeroing during a single processing of the measurement object, but it can skip both or perform only the zeroing.

BRIEF DESCRIPTION OF THE DRAWINGS

In the following the invention and its preferred embodiments are described in more detail referring to examples according to FIGS. 4 to 10, in the appended drawings, wherein.

DETAILED DESCRIPTION OF THE INVENTION

Figure 4:
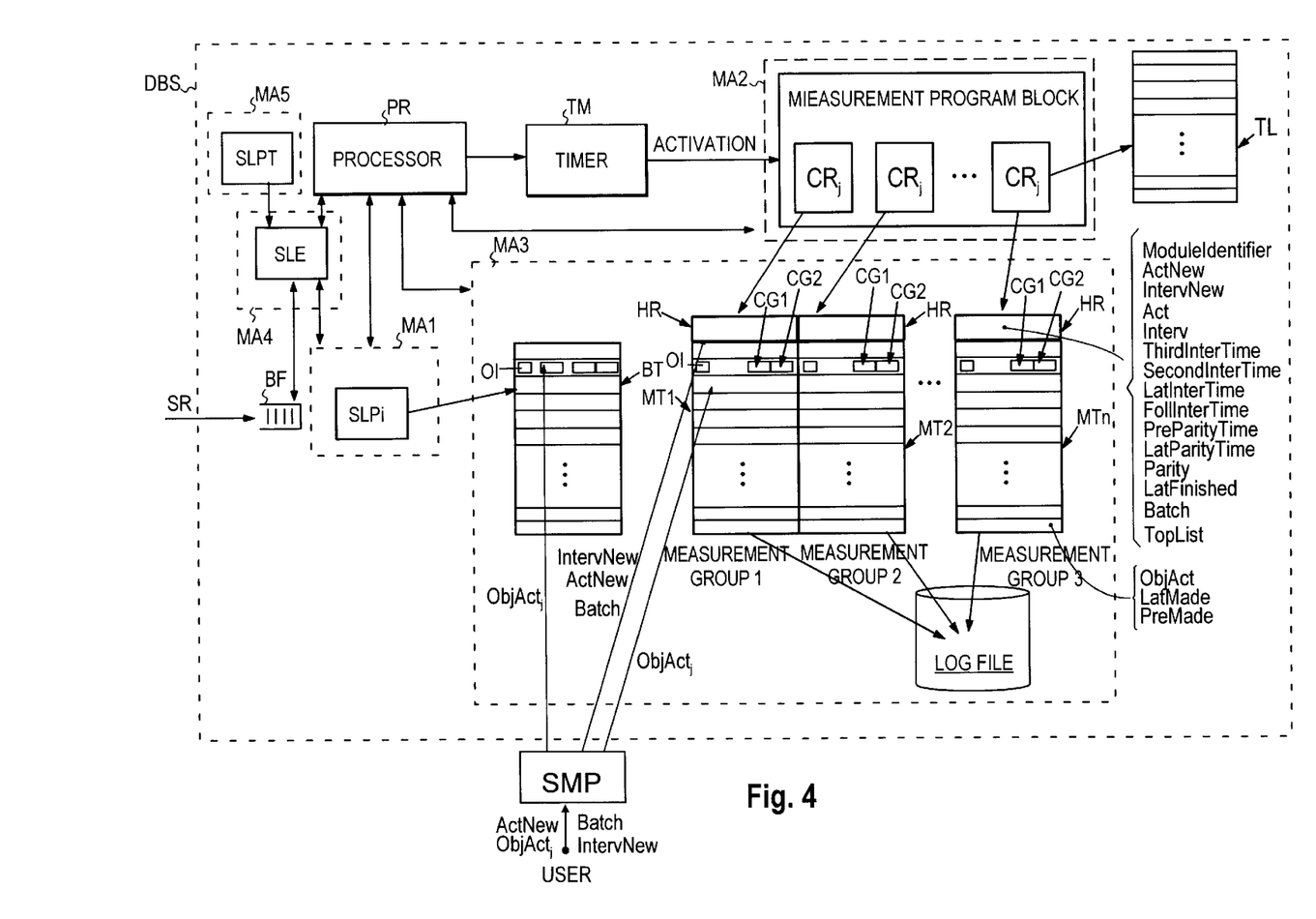
FIG. 4 illustrates the service database system according to the invention.

FIG. 4 demonstrates a database system DBS according to the invention which can be located, for example, in the SCP node of the intelligent network. The database contains at least one basic data table BT and at least one measurement table MT which contain a large number of consecutive rows. The figure shows one basic table and three measurement tables.

One row in the basic table corresponds to an individual measurement object (for example, a subscriber). The object identifier OI is located at the beginning of the row. The objects in one basic table belong to the same measurement object class; in other words, the objects of one basic table are of the same type. One object in the basic table can be included in several different measurement tables MT, for example, the same subscriber can be included in a call count measurement, where the recording interval is, for example, 5 minutes, and in a call count measurement, where the recording interval is, for example, 24 hours. Additionally, each row of the basic table contains the parameters that indicate in which measurement groups the object in question has been included as an active object. From now on the identifiers of these parameters are $ObjAct_j$ (j=1 . . . the number of measurement groups). The parameter values can be set by the user.

A single measurement table consists of the header row HR and consecutive rows Ri (i=1 . . . n). A single row Ri of the measurement table comprises the object-specific parameters and a dedicated set of measurement group-specific counters. Each measurement table forms a specific measurement group as described earlier. Each measurement table thereby includes the objects for which an identical measurement is performed. For example, one measurement table of the figure could include the subscribers for which a call count recording is being performed, the second table the subscribers for which an event counter recording is being performed, and the third table the subscribers for which a call length recording is being performed. As stated earlier, even the measurements of one type (for example, call count recordings) can have several different measurement tables.

On the header row HR of the measurement table are located the parameters that are common to the entire measurement group. These parameters are described later.

From the viewpoint of the method according to the invention, another essential part of the system is the list (or table) of the most called objects into which the system collects during the recording interval, for example, the group of ten most called objects. The sorted contents of this list are written in the associated data table after the rows have been processed during the recording interval or afterwards, when it is detected during the recording interval that the row processing was not completed during the recording interval that just ended.

The service logic programs instance SLPi reads the rows in the basic table BT so the basic table rows also include parameters that are used for producing the service. However, because they do not belong in the scope of this invention, they are not described in more detail here.

The service request SR sent by the SSP includes the subscriber (object) identifier. When the SCP receives such a service request, a service logic program instance SLPi of the service logic program is created, and this instance starts serving the service request in question. This is carried out in a known manner such that the service logic execution block SLE included in the system creates a service logic instance SLPi by copying the service logic program templates that are stored in the block SLPT. This copy (or SLPi) is placed in the use of the received service request. The service logic execution block SLE retrieves the service requests from the buffer BF in which the incoming service requests are stored.

The SLPi reads the subscriber identifier in the service request after which it can read from the basic table the row corresponding to the identifier. From the row the SLPi finds out the values of the parameters ObjAct$_j$ (j=1, 2 ... ). If the object is active, the SLPi reads from the header rows of the measurement tables in which the object in question is included whether the measurement group is also active. This is indicated by the parameter included in the header row of the measurement table, which parameter will be referred to from now on by the name ActNew. If both the object and the measurement group are active, the SLPi increments the value of one or more counters located in the row of the object in question in the measurement table. As FIG. 4 shows, the user gives the values of the parameters ObjAct$_j$ and ActNew via the management system (SMP). Because the parameter ObjAct$_j$ will be treated as a measurement group-specific parameter from now on, the index j will be omitted.

Figure 5A:
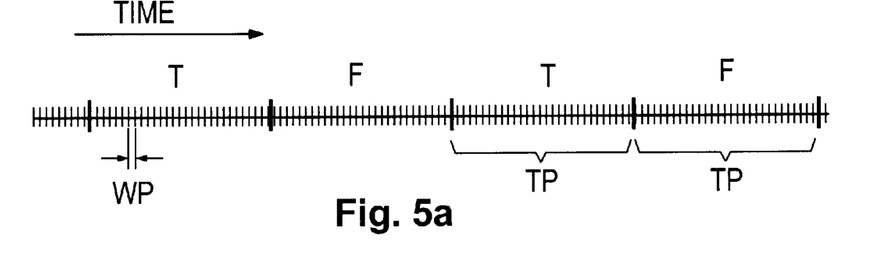
FIG. 5a shows a time axis which demonstrates the rotation principle that is followed in the system of FIG. 4.

The counters located on the rows of the measurement table are preferably duplicated so that two counter groups marked by the reference marks CG1 and CG2 are formed on the row. The groups include the same counters (one or more) which means that each counter of one group has a corresponding counter in the other group. The counters are incremented in turn so that the time axis is divided, as shown in FIG. 5a, into consecutive recording intervals TP of which every second one is marked with the reference symbol F and the intervening one with the reference symbol T. During the recording intervals F, the counters of, for example, the counter group CG1 are incremented, and during the recording intervals T, the counters of the counter group CG2 are incremented (or vice versa). The interval being in turn at each moment is determined by the parity parameter maintained in the header rows of the measurement tables. When the SLPi reads the header row of a measurement table, it also reads the value of the parity parameter, and thereby it recognizes which counter located in the row of the measurement table it must increment. The parity parameter is a Boolean variable which can have values T(rue) or F(alse) which is why every second time interval in the figure is referred to with the reference symbol T and the intervening time intervals with the reference symbol F.

The service logic program instance SLPi handles the incrementing of event counters independently which means that it blindly increments the counters if it detects that the measurement group and measurement object in question are active. The measurement program block, on the other hand, handles the recording and zeroing of the counters on the rows. The measurement program block may contain subblocks CR$_j$ for recording and zeroing the counters of each measurement group. Additionally, the measurement program block (or the subblock CR$_j$) controls the changing moments of counters by switching the parity value at the beginning of each recording interval TP. In the recording intervals in which the SLPi increments the counters of the counter group CG1, the measurement program block processes the counters of the counter group CG2, and in the recording intervals in which the SLPi increments the counters of the counter group CG2, the measurement program block processes the counters of the counter group CG1. The counter increment (or, in other words, recording the events) is thereby handled by a process separate to the counter recording and zeroing process, said separate process merely using the value of the parity parameter without knowing anything else about the phase in which the counter recording process operates. From now on the counters whose values are being incremented will be called active counters and the counters whose values are being recorded and zeroed will be called passive counters. The counter values incremented during a certain recording interval are thereby processed during the recording interval following the recording interval in question. During this following recording interval, on the other hand, is incremented the counter group which was processed during the previous recording interval.

Another essential part of the system is the wake-up timer TM which is used to set up the processor PR to start the measurement program block at short intervals WP (FIG. 5a). The length of the wake-up interval may be, for example, 10 seconds which means that the wake-up interval is very short compared to the recording interval TP. The wake-up timer or timers can be group-specific or shared by several measurement groups.

By using a user-specified parameter it is possible to determine measurement group by measurement group the maximum number of objects whose counters the measurement program block is allowed to process during one execution, i.e. during one wake-up. If there is enough time to process the passive counter groups for all objects during the recording interval (or, in other words, by the time a new changing moment of the recording interval is detected), a flag is set for the measurement group as an indication that it is no longer necessary to process the measurement objects during the recording interval in question. Even though the counter recording and zeroing process will still be woken up at short intervals by using the wake-up timer, the measurement objects are no longer processed.

As stated earlier, it is preferable to have the same processor execute both the measurement program and the service logic program SLPi. In FIG. 4 this common processor is indicated by the reference symbol PR. The measurement program execution is always started by the timer TM always when the interval WP has passed.

The database with its data tables and the measurement program and the service logic program can be located in the same RAM memory, but the system can also be such that the database with its datatables is located on the disk. In this case, the system contains two processors so that one of them executes the service logic program and the other handles the counter values maintained on the disk. In any case certain memory areas MA1 . . . MA3 are associated with the processor in which the measurement program block, service logic program block, and the database with its data tables are located. The memory area of the service execution block is indicated by the reference symbol MA4 and the service logic template memory area by the reference symbol MA5. However, as mentioned above, it would be best for the response times to use RAM memory and one processor.

If there is not enough time in the allocated recording interval TP to process the passive counter groups for all objects (subscribers), for example, because of processor overload, the rest of the objects are left unprocessed. The principle is that undone tasks are not left to pile up.

However, the procedure marks the rows whose processing could be completed within the interval. (If there are unprocessed rows, it is impossible to write in the log file and the counters are not zeroed.) However, the service logic program instance blindly increments all counters, including those on unprocessed rows. However, these rows cannot be processed later on, because their values are no longer from an interval the length of the recording interval, for example, from an interval of 5 minutes. When the measurement program starts processing the rows, it is checked separately whether the counter value can be written in the log file. The counter values are thereby incremented blindly, but during the following processing interval it is checked whether the value is valid to be written in the log file or not.

By using rapidly repeated wake-ups it is possible to handle the varying recording intervals of different measurement groups. The system does not thereby include a counter (timer) of its own for each recording interval of different length which different measurement groups feature, but the system has only one counter which wakes up the measurement program at short intervals, for example, every 10 seconds. During each wake-up the measurement program checks whether it has to start processing object-specific counters. Thus it is possible, for example, in a processor overload situation to trust that at some point when the overload eases up, the timer will get to expire and the recording and zeroing process triggered by the timer knows what it has to do in each situation. The processor lag is thereby solved by using a method which is easier than the use of separate timers. In the case of separate timers, the lag caused by excessive processor load would cause problems because the timer is always set to the same interval value. In this case, the synchronization between the time and the expiration moments should be handled in some way.

The following is a description of the parameters that are essential in a system according to the invention. The following are parameters which are common to the measurement object group and which are included in the header row of each measurement table MT:

| PARAMETER | DESCRIPTION | TYPE |
| --- | --- | --- |
| ModuleIdentifier | The identifier of the measurement module | I |
| Act | The activation parameter in use | B |
| ActNew | The new activation parameter | B |
| Interv | The length of the recording interval in use | I |
| IntervNew | The new length of the recording interval | I |
| LatInterTime | The latest changing moment of the recording interval | I |
| SecondInterTime | The second-latest changing moment of the recording interval | I |
| ThirdInterTime | The third-latest changing moment of the recording interval | I |
| FollInterTime | The following changing moment of the recording interval | I |
| LatParityTime | The latest changing moment of the parity | D |
| PreParityTime | The second-latest changing moment of the parity | D |
| Parity | The parity | B |
| Batch | The maximum number of rows processed at one time | I |
| TopList | The parameter that indicates whether a list of most called objects will be generated from the measurement module. | B |
| LatFinished | The parameter that indicates whether all rows of a table have been processed | B |

The parameter type is I for integer variables, B for Boolean variables, and D for real time stamps (date, hours, minutes, seconds). The length of the recording interval is given in minutes.

The user can define the values of the measurement group activation parameter ActNew, the recording interval length IntervNew, and the maximum number of rows processed in one time Batch. The other parameters listed in the table are parameters internal to the system and they cannot be defined by the user. The time stamps that indicate the changing moment of the latest recording interval (LatInterTime), the changing moment of the second-latest recording interval (SecondInterTime), and the changing moment of the recording interval before that (ThirdInterTime), and the changing moment of the following recording interval (FollInterTime) are preferably minute indexes so that they are integer variables by type (because the time used in the system is discrete).

The latest changing moment of the parity (LatParity Time) and the changing moment of the parity before that (PreParity Time) must also be retained, because they are not usually precisely the same as the defined changing moments of the recording interval. The reason for this is that if the measurement program starts, for example, ever 10 seconds, the changing moment of parity typically exceeds the defined changing moment of the recording interval by a few seconds. These parameters are thereby needed so that it is possible to determine the exact length of the interval from which the counter values are. The parameter LatFinished indicates if the processing of all rows of a measurement table has been completed (the counter values have been recorded and zeroed).

A single row of a measurement table contains at least the following measurement object-specific parameters:

| PARAMETER | DESCRIPTION | TYPE |
| --- | --- | --- |
| ObjAct | The activation parameter of the object | B |
| LatMade | The latest processing time of the row | I |
| PreMade | The second-latest processing time of the row | I |

Row-specific time stamps (LatMade and PreMade) are minute indexes similarly to the parameters that indicate the changing moments of recording intervals. From now on, the row-specific time stamps are referred to as stamp P (PreMade) and stamp L (LatMade).

FIG. 4 shows the parameters which are located on the object row and on the header row of a measurement group.

Figure 6:
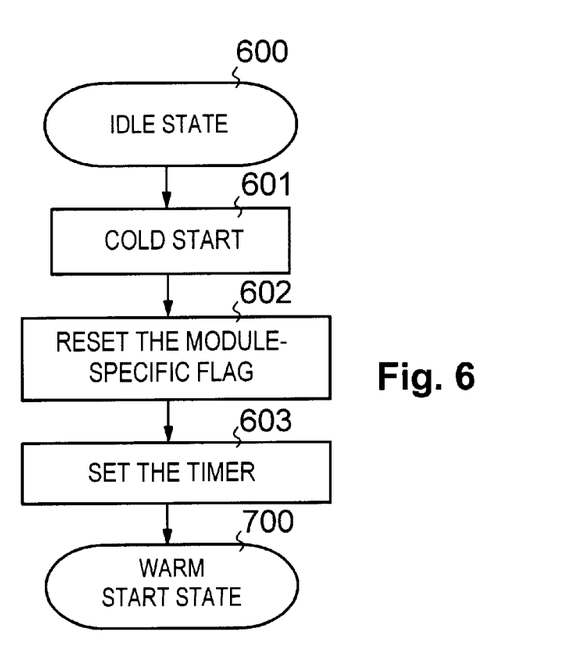
FIG. 6 is a flow chart that shows the shift of the system from the idle state to the normal operation state, and FIGS. 7a to 7d form a flow chart that describes the progress of a recording and zeroing process.

FIG. 6 shows as a flow chart the shift of the system from the idle state 600 to the normal operation state, or the so-called warm start state 700. When the system receives the so-called cold start signal (phase 601), the module-specific flag (parameter Alive) is set to zero to indicate that the activation in question is a cold start (phase 602). After this, the wake-up timer (TM, FIG. 4) is set in phase 603 to expire after a short wake-up interval (WP, FIG. 5a), after which the system shifts to the warm start state 700.

FIGS. 7a to 7d show as flow charts the progress of the recording and zeroing process performed by the measurement program block. When the process is in the warm start state and the timer TM expires (phase 701), the counter recording and zeroing process starts. In the last phase the timer is set to expire again (phase 745, FIG. 7d) after the predefined time. When the timer expires again, the recording process is gone through again and, as in the previous phase, the timer is set to expire again. As described above, the interval between the expirations can be, for example, 10 seconds. In practice, the time taken by one execution of the procedure for one row of the measurement table may be about 50 µs so when there are, for example, 100 rows to be processed at one time in ten different modules, the time taken by one execution is about 50 ms.

Figures 7, 7A:
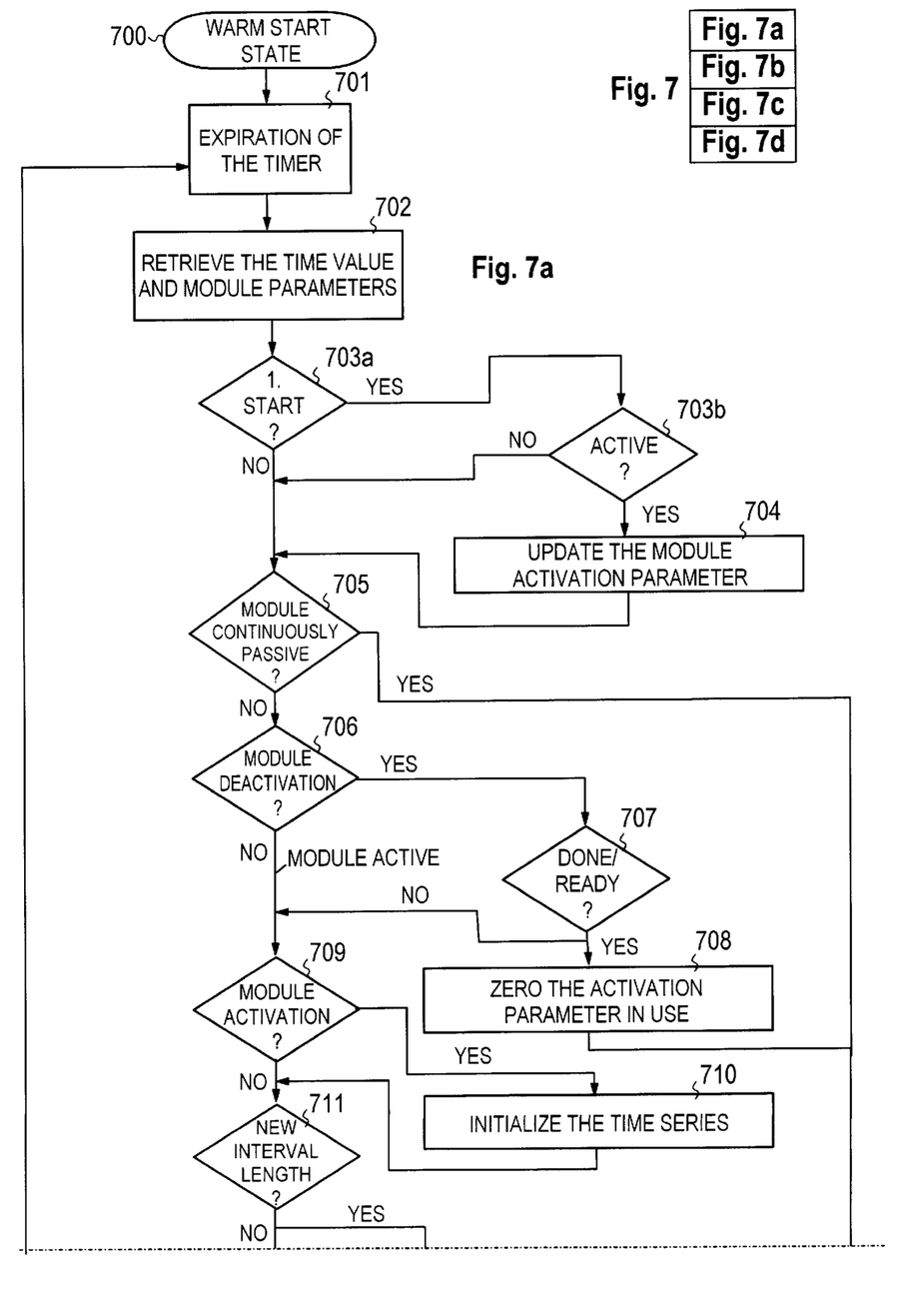

When the timer has expired, the system goes to phase 702 in which it retrieves the value of the current time and the module parameters from the header row of the module. The value of the current time is identical to the expiration moment of the timer, and this value stays the same for the entire time taken by one execution caused by the expiration (wake-up). The time value is used to determine the current minute index (for example, calculated from the start of a certain year). The program retrieves from the header row of the measurement table the values of the user-specifiable parameters ActNew, IntervNew, and Batch. After this the program tests in phase 703a, whether the activation in question is the first activation of the recording process after the cold start signal. This is done by testing whether the value of the aforementioned module-specific flag is zero. If this is the case, the program tests in phase 703b, whether the value of the user-specifiable module-specific activation parameter ActNew is greater than zero (or, in other words, has the module been activated). If the condition is true, the above-mentioned parameter is the value ActNew=1 which indicates a recent module activation performed by the user, and the cold start flag is turned off or, in other words, the parameter Alive is assigned the value 1 (phase 704). Phase 704 is thereby entered only via cold start and when the module is active. In any other case, the program goes from phase 703a or 703b to phase 705 in which the program tests whether the module in question is continuously passive (measurement has not been activated). This is done by testing whether the activation parameter in use Act is smaller than or equal to zero and whether the user-specified activation parameter ActNew is also smaller than or equal to zero (or, in other words, if the old value of the module activation parameter is zero and the new value is also zero). If this is the case (or, in other words, the module is continuously passive), the program proceeds directly to phase 745 in which the wake-up timer TM is set to expire again.

If this is not the case, the program proceeds to phase 706 in which it tests whether the module has been switched to passive after the latest wake-up of the counter recording and zeroing process (measurement has been stopped). This is done by testing whether the activation parameter in use Act is greater than zero and the user-specified activation parameter ActNew smaller than or equal to zero. If this is the case, the value of the activation parameter in use is set to zero. This is done in phase 708, but the program can only proceed to this phase when the time is suitable for making the change in question as far as the counter value recording and zeroing process is concerned. The suitability of the time is tested in phase 707 in which the program tests whether all rows have been processed or if the next changing moment of the recording interval has been passed. This is done by testing whether the value of the parameter LatFinished is one or whether the value of the parameter CurrentMinute defined at activation is greater than or equal to the value of the parameter FollInterTime which indicates the next expected changing moment of the interval. When the measurement module is stopped in phase 708 by setting the activation parameter in use to zero, the program goes directly to the end where the timer is set to expire again.

If the changing moment is not yet suitable or the module had not been stopped (or, in other words, if the module is active), the program tests in phase 709 whether the module was switched to active status after the previous execution or, in other words, whether the module was started after the previous execution. This is done by testing whether the value of the user-specified activation parameter ActNew is smaller than one hundred (activation by the user corresponds to value one which thereby indicates that the module is being activated). If this is the case, i.e. if the module has been started after the previous wake-up, the program goes to the initialization phase 710. In any other case, the program goes to phase 711 where it tests whether the length of the recording interval has changed.

In phase 704 described above the value of the user-specified activation parameter ActNew is thereby artificially set to one so that the program can go in all necessary cases from phase 709 to the initialization phase 710. Such a situation can be, for example, the switchover taking place in a duplicated computer system. When the back-up side starts (cold start), this ensures that the recording process will progress to the initialization phase 710 also if the user-specified module-specific activation parameter had a value which indicates an active state (in this example, value 1 or 101) when the switchover occurred. The switchover does not thereby require any additional actions, but the system also acts as if the user had just activated the measurement group in the case where the measurement group had been active.

In the initialization phase 710 the activation parameter in use Act is given the value of the user-specified parameter ActNew, the parameter Interv that indicates the length of the recording interval in use is given the value of the parameter IntervNew defined by the user, and the value of the user-specified activation parameter is increased by one hundred so that it is possible to detect after this in phase 709 that the module has not been activated just now. Additionally, the time stamps LatInterTime, SecondInterTime, and ThirdInterTime and FollInterTime are assigned the value of current time (currentMinute) rounded up to the next full minute.

The module-specific parameters must thereby be initialized to a time later than the activation time. This kind of a correct initialization ensures, among other things, that all old row-specific time stamps are older than or equal to the changing moments of intervals in which case also the inequalities (described later) that determine whether the program writes in the log file or not are correctly true or false regardless of, for example, the time at which the object-specific measurement is started.

During the initialization phase the parity variable Parity is assigned the value zero and the parameter LatFinished the value one so that the rows of the measurement table are not processed during the first short minute after the starting of the module. Additionally, the system maintains the information about the two latest changing moments of parity. These parameters (LatParity Time and PreParity Time) are assigned a time stamp during the initialization phase which indicates the current correct time (date, hours, minutes, seconds).

Figure 7B:
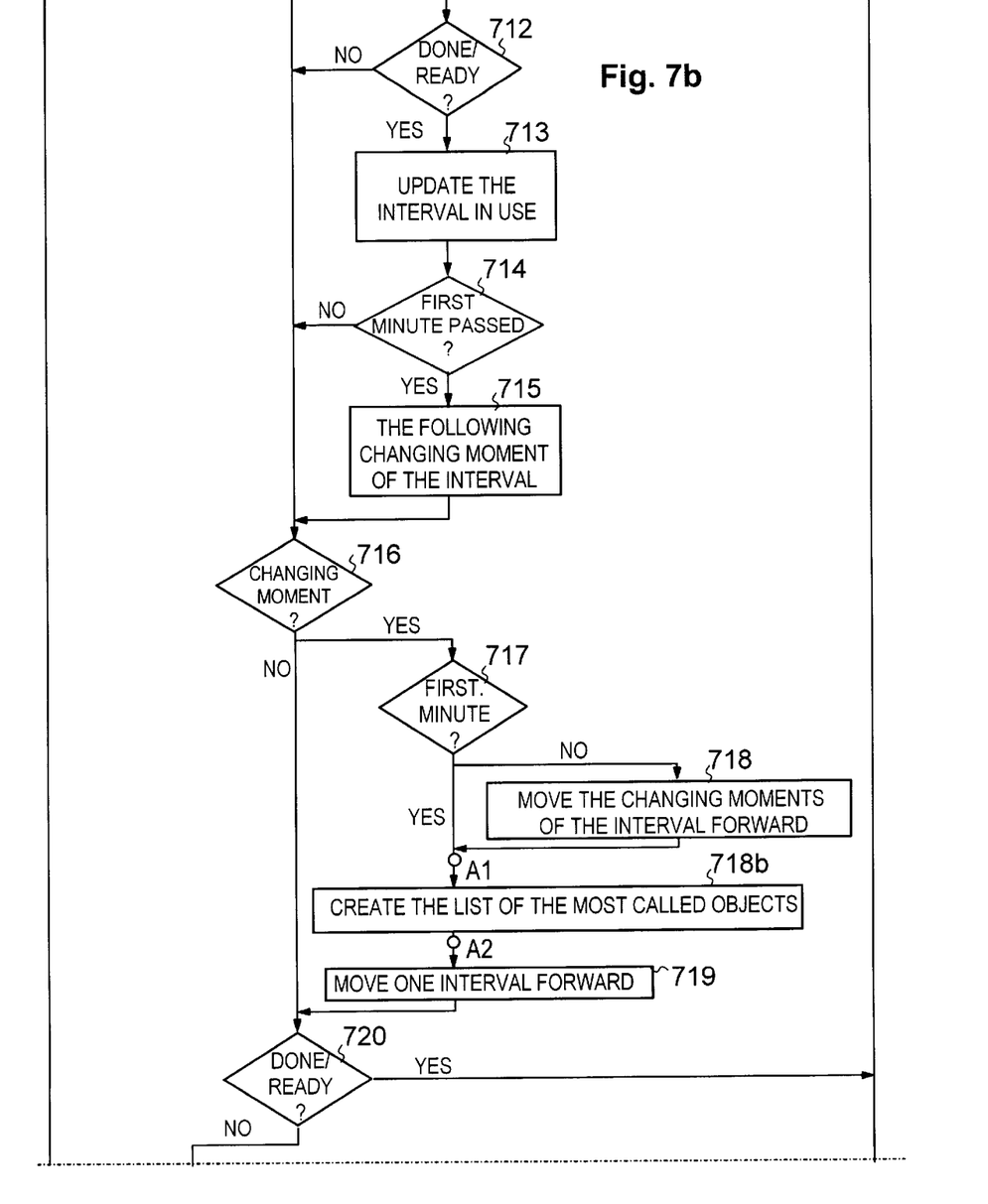

In phase 711 the program tests, as mentioned above, whether the length of the recording interval has changed. This is done by testing whether the new value (IntervNew) is equal to the old value (Interv). If this is the case (or, in other words, no change has occurred), the program goes directly to phase 716 where it tests whether the expected changing moment of the recording interval has already been reached or passed.

If the user has changed the value of the recording interval, the new value of the recording interval is updated to it in phase 713 and the next changing moment of the recording interval is calculated in phase 715. However, these actions are only carried out when the current moment is suitable.

The suitability of the moment is tested in phase 712 by performing a test identical to that in phase 707. The operations (updating in phase 713) can thus be carried out only if there has been enough time to process all rows during the current recording interval or if the changing moment of the next recording interval (which was calculated on the basis of the old length of the recording interval or which was, in the case of module activation, initialized to the next full minute in phase 710) has been reached or passed. If either of these conditions is met, the length of the recording interval is updated to its new value in phase 713. Before the updating of the next changing moment of the recording interval (phase 715) can be done, there is one additional condition which must be met and which is tested in phase 714. In this phase, the program tests whether the first changing of the full minute has been passed since the activation of the module. This test is done by testing whether the value of the FollInterTime is equal to that of the parameter LatInterTime (the values are equal until the first wake-up occurs after the first full minute; the parameter FollInterTime is updated immediately after the first full minute has been passed, as will be shown later). If the values are not equal, the first minute has been passed and the program can perform the updating of the next changing moment. The first changing moment of the interval after the activation moment of the module (FollInterTime) is thereby always set to the first full minute and only after that to, for example, even hours if the length of the new recording interval is one hour. This first changing moment of the interval (the first full minute) is thereby the moment to which the time stamps that indicate the changing moments of intervals were initialized in phase 710. It is desirable that the program does not process rows at all during the first short minute after the module activation. For this the value of the parameter LatFinished was set to one in phase 710. This is due to the fact that the row-specific processing stamps will in any case be set to the next minute in which case any processing of rows done during the first short minute goes to waste (because in this case the row-specific stamp does not indicate whether it is an old or a new stamp or, in other words, whether it originates in the time preceding the activation or in the time after the activation). The row processing after module activation (recording and zeroing counter values) is thereby started only after the first full minute.

A new estimate is calculated for the following changing moment of the interval (phase 715) so that at first the value of the current minute (currentMinute) is divided by the length of the recording interval and the remainder is stored. The new estimate is obtained by subtracting the obtained remainder from the current minute and the length of the recording interval is added to the difference (or FollInterTime:=CurrentMinute−mod(CurrentMinute/Interv)+Interv). The following changing moment is thereby determined on the basis of the current time and the length of the recording interval. The calculation does not thereby take into account the value of the parameter LatInterTime because, for example, in an overload situation the processor may have lagged in which case the corresponding lag would appear in the value of the following changing moment.

After this the program tests in phase 716 whether the following changing moment of the recording interval has been reached. This is done by testing whether the value of the parameter CurrentMinute (or, in other words, the minutes taken from the clock time when seconds are ignored) is greater than or equal to the value of the parameter FollInterTime. If this is not the case, the program goes straight to phase 720. In any other case the program goes towards the phase 718 in which the time stamps related to changing moments of intervals are pushed forward. In this event, the parameter LatInterTime that indicates the changing moment of the latest recording interval is given the value CurrentMinute−mod(CurrentMinute/Interv), the parameter SecondInterTime that indicates the changing moment of the recording interval preceding that is given the old value of the parameter LatInterTime, and the parameter ThirdInterTime that indicates the changing moment of the third-latest recording interval is given the old value of the parameter SecondInterTime. At this point, the program does not thereby give as the value of the parameter LatInterTime the value of the parameter FollInterTime (i.e. the value of the changing moment that has been passed), but the value of the parameter LatInterTime is calculated in the aforementioned manner on the basis of the value of the current minute so that any possible processor lag would not affect the value of the parameter. The value of the parameter LatInterTime is thereby updated to the value equal to the current time rounded down to a full minute, subtracted by the aforementioned remainder whose value is usually zero and which compensates for any lag.

However, the time stamps are not pushed forward if the changing moment of the interval detected in phase 716 is the changing moment of the interval assigned for the first full minute after the module activation. This fact is tested in phase 717 by using a test similar to that in phase 714 (or, in other words, if the value of the parameter FollInterTime does not at this point equal the value of the parameter LatInterTime, the first full minute after the module activation has been passed).

After the pushing of time stamps which occurs in phase 718 or after the test performed in phase 717, the process goes to phase 718b in which it performs operations which relate to the generation of the list of the most called objects, said operations being described later in FIG. 8.

After the operations related to the generation of the list, the program calculates in phase 719 a new value for the following changing moment of the interval (or, in other words, FollInterTime=CurrentMinute−mod(CurrentMinute/Interv)+Interv). This is carried out also in the case in which it was detected in phase 717 that the changing moment of the interval was, after all, the first full minute after the module activation. In phase 719 the program also switches the parity value and pushes the latest and the second-latest changing moments of parity forward so that the parameter LatParityTime is assigned the value of the current actual time stamp and the parameter PreParity Time is assigned the old value of the parameter LatParityTime. Because, additionally, the row processing is approaching, the parameter LatFinished is assigned the value of zero at this point so that the system notices that the row processing has not been completed. Let it also be noted that even if the row processing were incomplete and the program detects that the changing moment of the interval has been passed, the parameter LatFinished is still reset to zero.

After this the program tests in phase 720 (to which the program may have arrived directly from phase 716) whether the row processing phase is complete or, in other words, whether all rows have already been processed. If this is the case, the program goes directly to phase 745 in which the timer is reset. If the row processing is incomplete or if it has not even started yet (or, in other words, the value of the parameter LatFinished is zero), the program goes to phase 721 in which the row counter is initialized. After that the program reads the next row in the measurement table of the module. If the new row was read successfully, the program goes to phase 725. In any other case, the program marks all rows as read (the parameter LatFinished is assigned the value of one, phase 724) and the program proceeds via phase 724b directly to phase 745 in which the timer is zeroed. Operations are performed in phase 724b which relate to the generation of the list of the most called objects, said operations being described later in FIG. 9.

Figure 7C:
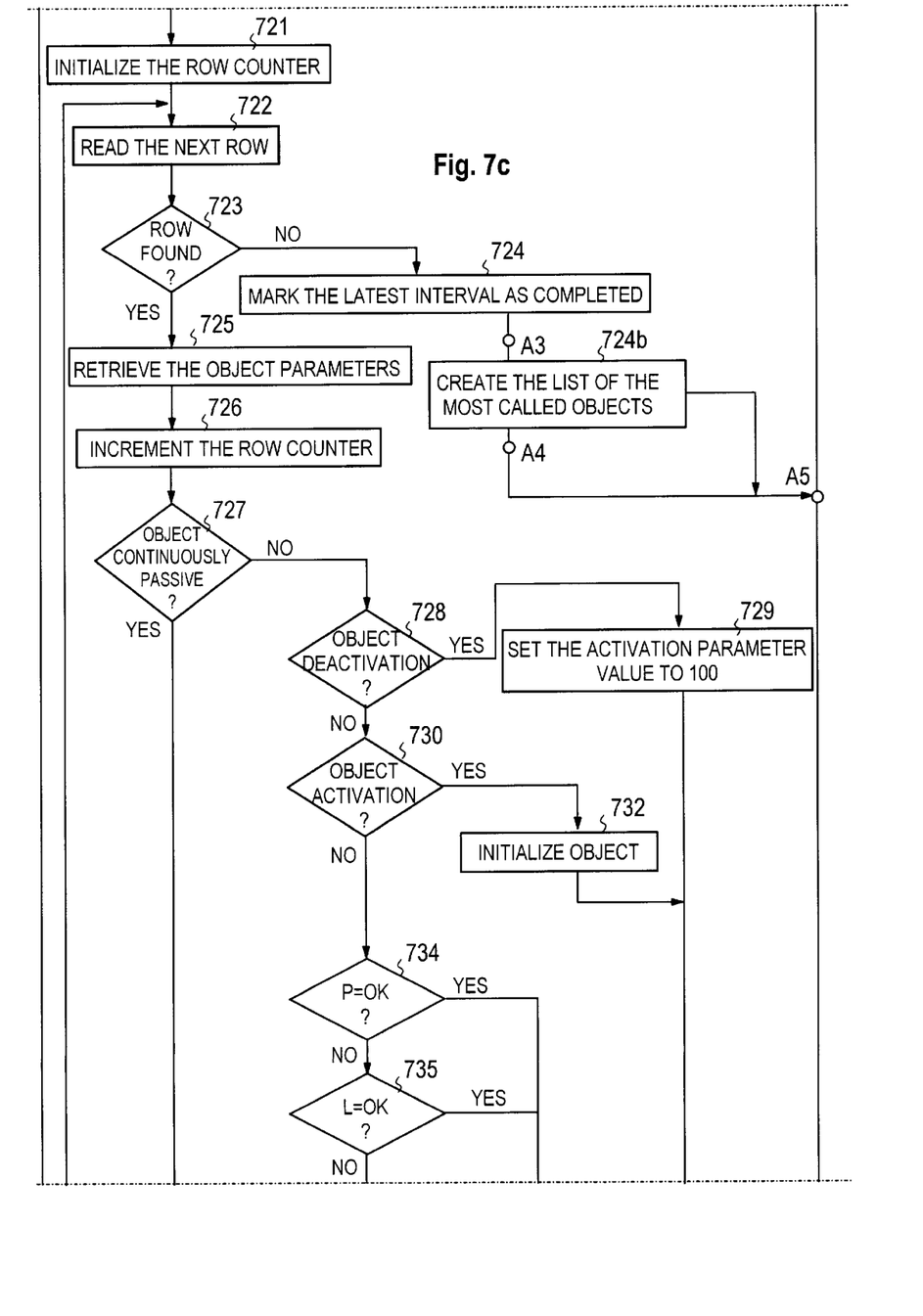

In phase 725 the program retrieves the parameters of the object from the row, such as the subscriber identifier (OI), the object-specific activation parameter (ObjAct), the time stamp for the latest processing of the row (LatMade) and the time stamp for the second-latest processing of the row (PreMade). After this the value of the row counter is incremented by one (phase 726). When the counter value has been incremented, the program proceeds to phase 727 in which it tests, whether the object in question is continuously in the passive state. This is done by testing whether the value of the object-specific activation parameter ObjAct is one hundred (which is selected as the value to be used in the test). If this is the case, the program proceeds via phase 744 to phase 722 to read the next row (which is reached on the basis of the value of the row counter) or to phase 745 to set the timer. In any other case the program tests in phase 728 whether the object may possibly be switched after the latest wake-up to passive state. This is done by testing whether the object-specific activation parameter ObjAct is smaller than or equal to zero. If this is the case, the value of the object-specific activation parameter is set to one hundred, which will indicate from now on that the object is continuously passive. This is done in phase 729 from which the program proceeds directly to phase 741. If the result of the test carried out in phase 728 is negative (or, in other words, the object is active), the program proceeds to phase 730 in which it tests whether the object was switched after the latest execution to active state or, in other words, whether the measurement related to the object has just been started. This is done by testing whether the value of the object-specific activation parameter ObjAct is smaller than one hundred but greater than zero (or, in other words, whether the value is one). If this is the case, i.e. if the object has just been activated, the program proceeds to the object initialization phase 732 in which the program initializes the time stamps LatMade and PreMade located on the row to the next minute following the current minute and sets the activation parameter of the object to the value which equals the previous value of the parameter (one) plus one hundred (ObjAct:= ObjAct+100). After this the program proceeds directly to phase 741 in which it checks the parity value and goes after that to zero one or the other of the counter groups (phase 742 or phase 743). The counter group to be reset depends on the parity value. From these phases the program goes to phase 744 in which it tests whether the row counter has reached the user-specified number of rows processed at one time (Batch). If this is the case, the program goes to phase 745 in which the timer is set to expire again, but if this is not the case, the program returns to phase 722 to read the next row.

Figure 7D:
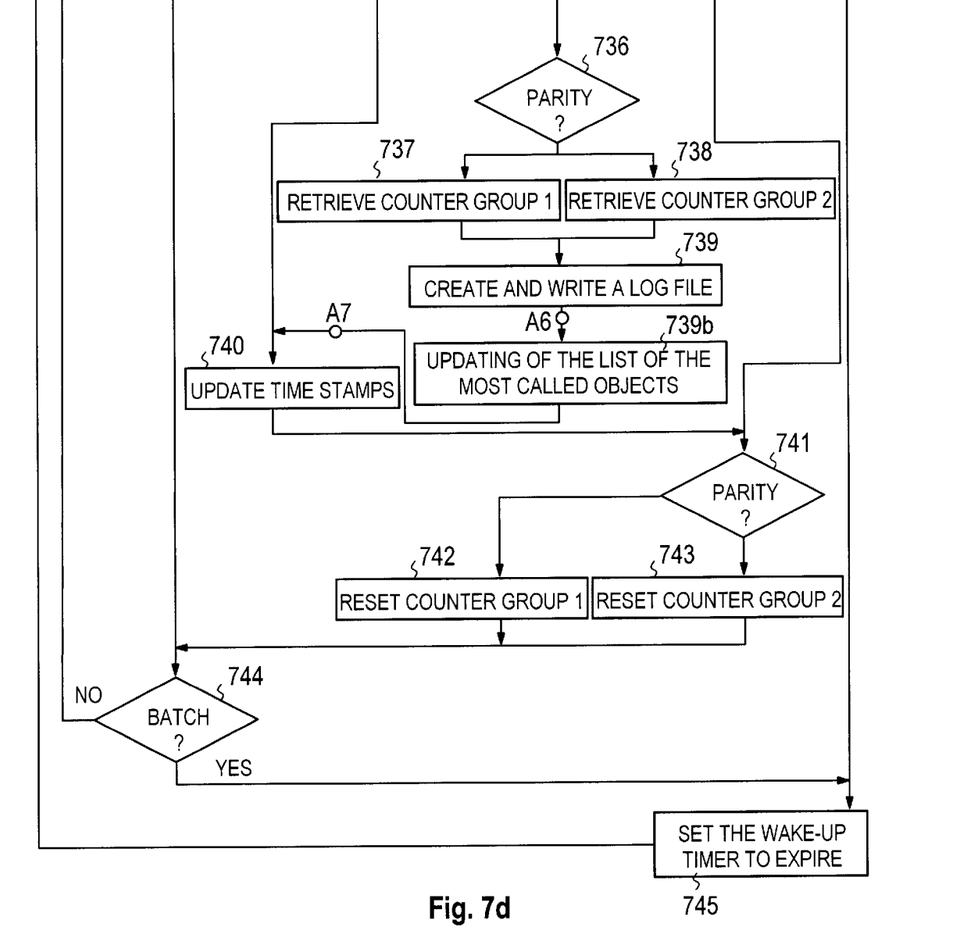

If the program detected in phase 730 that the event in question is not that of the object switching from passive to active state, the program goes to phase 734 in which it tests whether the aforementioned inequality related to the time stamp P [ThirdInterTime]<P≦[SecondInterTime] is true (where the brackets denote the values of the time stamps). If this is the case, the program jumps directly to phase 736 in which it checks the parity value and, after that, goes to read the values of either the first or the second counter group (in phase 737 or 738) depending on the parity value. After this the program writes in the log file in phase 739. If the inequality related to the time stamp P was false, the program tests in phase 735 whether the inequality related to the time stamp L (LatMade) [ThirdInterTime]<L≦ [SecondInterTime] is true. If this is the case, the program goes to phase 736 to check the value of the parity variables from which it continues in the manner described above by writing in the log file.

After the writing the updating of the list of the most called objects in block 739b is performed. This block is described later in more detail in FIG. 10. From block 739b, or from phase 735 if the inequality related to the time stamp L was false, the program goes to phase 740 in which the time stamps located on the row (stamps P and L) are updated. The stamp P is given the old value of the stamp L and the stamp L is given the value equal to the current minute rounded up. After the time stamp updating, the program goes to phase 741 to check the parity from which the process continues in the manner described above. The row-specific time stamps are thereby updated after the row has been processed.

Figure 5B:
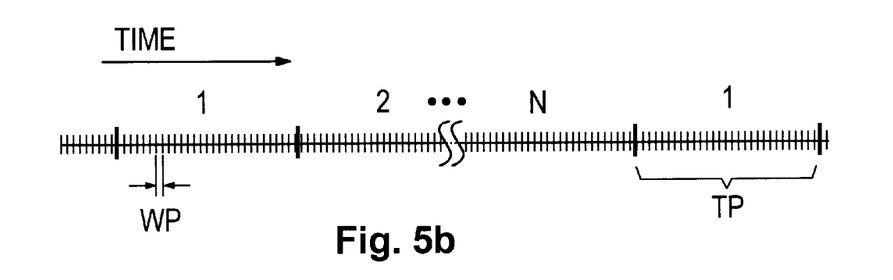
FIG. 5b shows a time axis that demonstrates the general rotation principle that is followed in the system of FIG. 4.

The recording and zeroing process of counter values described above is thereby gone through at short intervals by using the rotation rhythm shown in FIG. 5a (or 5b) in which the value of the (parity) parameter determines in each interval the counter group whose values are recorded in each row.

Furthermore, let it be noted that the recording and zeroing process described above was the description of processing one measurement table. To complement the above description it can be said that when the recording and zeroing process detects that the module has just been activated (phase 709), the time stamps LatInterTime, SecondInterTime, and ThirdInterTime are initialized (phase 710) to the nearest following full minute or, in other words, to the same moment of time as the time stamp FollInterTime. During the wake-up after the first full minute the program detects that the changing moment of the interval FollInterTime has been passed (phase 716), but there is no need to update the changing moments of the intervals LatInterTime, SecondInterTime, and ThirdInterTime, as they are already initialized. In other words, the program proceeds directly from phase 717 to phase 719 to update the next expected changing moment of the interval FollInterTime. The recording and zeroing process requires the aforementioned initialization value for the changing moments LatInterTime, SecondInterTime, and ThirdInterTime so that none of these time stamps would ever be older than the time of the wake-up during which the program detects that the module has been activated. This enables the deactivation of the module and its reactivation, for example, after only a few seconds.

Figure 8:
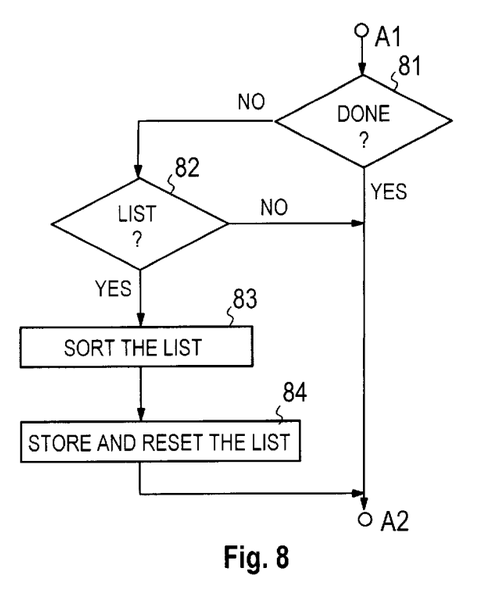
FIGS. 8, 9, and 10 are flow charts which illustrate in more detail the operations required for the generation of the list of most called objects during the recording and zeroing process shown in FIGS. 7a to 7d.

FIG. 8 illustrates in more detail the operations performed in block 718b. Initially the program tests (phase 81) whether all rows were processed during the current interval. This is done by testing whether the value of the parameter LatFinished equals one. If it is detected that the row processing was not completed, the program jumps to the phase in which it generates the list of most called objects, in any other case the program goes directly to phase 719 (point A2). In the previous case, the program first tests whether it is desired that the list is generated in association with this measurement module. This is determined by reading the value of the module-specific parameter TopList. If this value indicates that the list is not to be generated, the program proceeds directly to phase 719 (point A2). If, however, the value indicates that the list must be generated, the existing list is sorted (phase 83) by using a known sorting algorithm. After this the list is stored (the rows are written in sorted order in the data table which is reserved for the list of most called objects) and the list is zeroed so that it is ready for the next processing of the rows (phase 84). The zeroing means that the information about the counter value of the smallest object included in the list is initialized to zero for the next recording interval. The known standard exchange method, which is also called bubble sort, can be used, for example, as the sorting algorithm. Such a method is described, for example, in the publication Korpela, Larmela, Planman: Pascalohjelmointikieli, OtaDATA r.y., 1980, ISBN 951-767-034-6, section 12.4.1.

Figure 9:
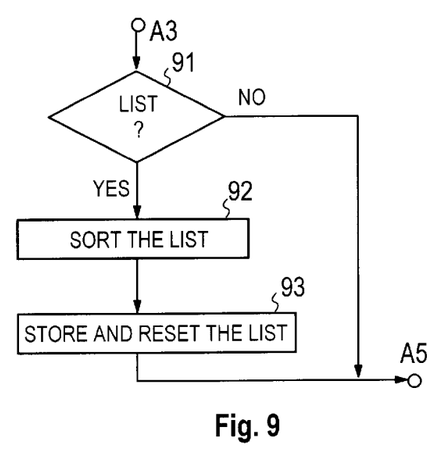

FIG. 9 illustrates the operations which are performed in block 724*b*. These operations are identical to those performed in block 718*b* in case the row processing was not completed. Let it be further be noted that the operations included in block 724*b* are always performed when all rows have been processed during a recording interval, after which the measurement table of the most called objects is completed.

Figure 10:
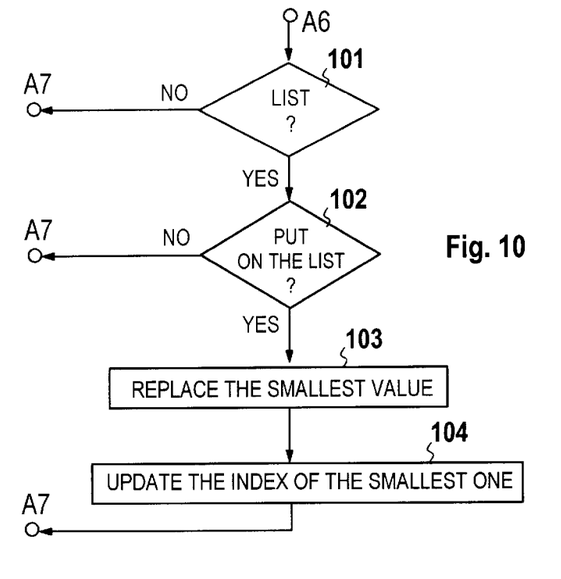

FIG. 10 illustrates the operations performed in block 739*b* which are performed in every row processing of the type in which the counter values are determined to be correct and valid to be recorded. At first it is tested whether it is desired that the list is generated in association with this measurement module (phase 101). This is determined by reading the value of the module-specific parameter TopList. If this value indicates that the list is not to be generated, the program proceeds directly to phase 740 (point A7). If, however, the value indicates that the list must be generated, the program next tests (phase 102), whether the counter value is included in the list. This is done by comparing the call counter value on the row to the smallest value included in the list, which value is maintained in the register. If the call counter value is smaller than said smallest value, the smallest value of the list is replaced by said call counter value (phase 103), but if this is not the case, the program proceeds directly to phase 740. After the replacement the program updates the index which corresponds to the smallest value of the list (phase 104). This is done by going over the entire list and by updating the index of the last item on the list by the index which corresponds to the smallest value included in the list.

It is also preferable to use in the system a separate module-specific auxiliary variable in the system which indicates whether the recording of counter values is allowed. The value of this auxiliary variable is determined according to whether at least one of the two inequalities related to time stamps is true. The use of the auxiliary variable has the advantage that, for example, in the measurement group which relates to the list of most called objects, recording can be forbidden entirely, even if the inequalities would allow it.

Even though the invention has been described above by referring to examples according to the attached drawings, it is clear that the invention is not limited to these examples, but that it can be varied within the boundaries of the concept of the invention described above and in the attached claims. In principle it is, for example, possible to generate a list of the least called objects in a corresponding manner, but such a list is unimportant as far as load control is concerned. The principle can also be followed even if copied counters were not used on the row and the rotation principle described above were not used in respect to time. Recording and list generation could be handled, for example, by a processor other than the one which handles the incrementing of counters. However, the rotation principle is preferable, because then it is possible to use a single processor and the list generation interferes as little as possible with the incrementation process of the counters. The simplest means to implement the rotation principle, on the other hand, is to use duplicated counters.

What is claimed is:

1. A method for monitoring load situation in a service database system, the database comprising measurement tables (MT) which comprise consecutive rows (Ri), whereby a single row comprises data related to a single measurement object and the measurement objects of one measurement table are of the same type so that they form a measurement group, the method comprising the steps of     receiving service requests (SR) into the system during whose processing it is necessary to count the number of events occurring per each measurement object,     activating the provision of the service as a response to the service request,     performing the recording of events by incrementing the measurement object-specific counters for each different event during the processing of the service request for a time determined by a certain, predefined recording interval, said interval being user-specifiable, and     performing the recording of counter values by storing the measurement object-specific counter values after each recording interval,     generating on the basis of the recorded counter values a list which includes a desired number of measurement objects which are largest in respect to the value of a specific counter,     characterized in that the method further comprises the steps of         performing the recording and zeroing of counter values in each recording interval to one measurement object at a time,         generating said list by recording interval so that within a recording interval during the processing of each individual object it is checked whether the value of said specific counter is greater than the counter value of the object with the smallest counter value included in the list at the moment and if this is the case, replacing the object with the smallest counter value with the object which corresponds to the row in question, and         storing the generated list at the end of the recording interval at the latest.

2. A method according to claim 1, characterized in that the method comprises the steps of     maintaining each measurement counter on the row of the measurement table corresponding to the measurement object as duplicated so that the first counter belongs to the first counter group (CG1), and the second counter to the second counter group (CG2), and     dividing time domain in consecutive recording intervals (TP) so that the counters of the first counter group are incremented and the counter values of the second counter group are recorded and zeroed during every other recording interval, and the counters of the second counter group are incremented and the counter values of the first counter group are recorded and zeroed during every other recording interval.

3. A method according to claim 1, characterized in that it is checked during the processing of an individual row, whether the counter values are valid to be recorded, and only valid values are accepted in the list.

4. A method according to claim 3, characterized in that the method comprises the steps of     maintaining in the system a measurement object-specific time stamp which indicates the latest moment when the zeroing has been performed on a row of the measurement object, and a time stamp which indicates the second-latest moment when the zeroing has been performed on a row of the measurement object, and measurement group-specific time stamps which indicate the three latest changing moments of the recording interval, and comparing the measurement object-specific time stamps to measurement group-specific time stamps, and accepting the counter values of the measurement object for recording if at least one of the two measurement group-specific time stamps is as desired between the time stamps indicating the second- and third-latest changing moments of the recording interval.

5. A method according to claim 1, characterized in that the list is sorted and stored in a data table in the sorted order when it is detected that all objects have been processed during the current recording interval, it is detected that the recording interval has changed but the processing of objects could not be completed during the previous recording interval.

6. A method according to claim 1, characterized in that lists of more than one recording interval are stored in the data table.

7. A method according to claim 1, characterized in that a list of desired length is initialized from the objects which are processed first by setting the smallest value included in the list to zero.

8. A method according to claim 1, characterized in that the list is used to provide criteria for rejecting service requests in overload situations.

9. A method for monitoring load situation in a service database system, the database comprising measurement tables (MT) which comprise consecutive rows (Ri), whereby a single row comprises data related to a single measurement object and the measurement objects of one measurement table are of the same type so that they form a measurement group, the method comprising the steps of receiving service requests (SR) into the system during whose processing it is necessary to count the number of events occurring per each measurement object, activating the provision of the service as a response to the service request, performing the recording of events by incrementing the measurement object-specific counters for each different event during the processing of the service request for a time determined by a certain, predefined recording interval, said interval being user-specifiable, performing the recording of counter values by storing the measurement object-specific counter values after each recording interval, and generating on the basis of the recorded counter values a list which includes the desired number of measurement objects which are smallest in respect to the value of a specific counter, characterized in that the method further comprises the steps of performing the recording and zeroing of counter values in each recording interval to one measurement object at a time, generating said list by recording interval so that within a recording interval during the processing of each individual object it is checked whether the value of said specific counter is smaller than the counter value of the object with the greatest counter value included in the list at the moment and if this is the case, replacing the object with the greatest counter value with the object which corresponds to the row in question, and storing the generated list at the end of the recording interval at the latest.

10. A method according to claim 9, characterized in that the method comprises the steps of maintaining each measurement counter on the row of the measurement table corresponding to the measurement object as duplicated so that the first counter belongs to the first counter group (CG1), and the second counter to the second counter group (CG2), and dividing time domain in consecutive recording intervals (TP) so that the counters of the first counter group are incremented and the counter values of the second counter group are recorded and zeroed during every other recording interval, and the counters of the second counter group are incremented and the counter values of the first counter group are recorded and zeroed during every other recording interval.

* * * * *